United States Patent
Schmidt et al.

(10) Patent No.: US 10,601,841 B2
(45) Date of Patent: *Mar. 24, 2020

(54) SYSTEM, METHOD AND COMPUTER READABLE MEDIUM FOR DETERMINING USERS OF AN INTERNET SERVICE

(71) Applicant: PERFTECH, INC, San Antonio, TX (US)

(72) Inventors: Jonathan E. Schmidt, San Antonio, TX (US); John A. Murphy, San Antonio, TX (US); Henry M. Donzis, San Antonio, TX (US); Lewis T. Donzis, San Antonio, TX (US); Peter W. Baron, San Antonio, TX (US); Rodney D. Frey, San Antonio, TX (US)

(73) Assignee: PERFTECH, INC, San Antonio, TX (US)

(*) Notice: Subject to any disclaimer, the term of this patent is extended or adjusted under 35 U.S.C. 154(b) by 183 days.

This patent is subject to a terminal disclaimer.

(21) Appl. No.: 15/832,458

(22) Filed: Dec. 5, 2017

(65) Prior Publication Data

US 2018/0097819 A1 Apr. 5, 2018

Related U.S. Application Data

(63) Continuation of application No. 14/507,237, filed on Oct. 6, 2014, now Pat. No. 9,838,402, which is a continuation of application No. 12/004,635, filed on Dec. 24, 2007, now Pat. No. 8,856,314.

(60) Provisional application No. 60/877,500, filed on Dec. 28, 2006.

(51) Int. Cl.
*H04L 29/06* (2006.01)
*G06F 16/955* (2019.01)
*H04L 12/58* (2006.01)
*H04L 29/08* (2006.01)

(52) U.S. Cl.
CPC ........ *H04L 63/126* (2013.01); *G06F 16/9558* (2019.01); *G06F 16/9566* (2019.01); *H04L 51/12* (2013.01); *H04L 51/24* (2013.01); *H04L 63/06* (2013.01); *H04L 63/08* (2013.01);
(Continued)

(58) Field of Classification Search
None
See application file for complete search history.

(56) References Cited

U.S. PATENT DOCUMENTS 7,222,157 B1 * 5/2007 Sutton, Jr. ............ G06Q 10/107
709/206
2002/0035622 A1 * 3/2002 Barber .................. G06Q 10/00
709/220

(Continued)

*Primary Examiner* — Thomas J Dailey

(57) ABSTRACT

An internet service provider (ISP) is configured to analyze data sent by a user to determine a subscriber account associated with the data and a user associated with the data. A database is then queried to determine the number of users of the subscriber account, with a number above a threshold indicating a likely theft of service. This automatic process is accompanied by automated messaging to the user with information as to the measures taken and remedial options. The messaging may be different dependent on whether the user is deemed to be an authorized user having subscriber account administration rights.

24 Claims, 6 Drawing Sheets

(52) U.S. Cl.
CPC .............. *H04L 67/22* (2013.01); *H04L 67/24* (2013.01); *H04L 67/306* (2013.01); *H04L 63/123* (2013.01)

(56) References Cited

U.S. PATENT DOCUMENTS

| | | | | |
|---|---|---|---|---|
| 2005/0207447 | A1* | 9/2005 | Sekiguchi | H04L 29/12 370/475 |
| 2006/0020812 | A1* | 1/2006 | Steinberg | G06F 21/31 713/181 |
| 2006/0198311 | A1* | 9/2006 | Molen | H04L 43/16 370/241 |
| 2007/0047449 | A1* | 3/2007 | Berger | H04L 12/2801 370/241 |
| 2007/0204033 | A1* | 8/2007 | Bookbinder | G06Q 10/10 709/224 |
| 2007/0271498 | A1* | 11/2007 | Schachter | G06F 16/9562 715/205 |

\* cited by examiner

SYSTEM, METHOD AND COMPUTER READABLE MEDIUM FOR DETERMINING USERS OF AN INTERNET SERVICE

CROSS REFERENCE TO RELATED APPLICATIONS

The present patent application is a continuation of U.S. patent application Ser. No. 14/507,237, filed Oct. 6, 2014, titled "SYSTEM, METHOD AND COMPUTER READABLE MEDIUM FOR DETERMINING USERS OF AN INTERNET SERVICE", now issued U.S. Pat. No. 9,838,402, issued on Dec. 5, 2017, which is a continuation of U.S. patent application Ser. No. 12/004,635, filed Dec. 24, 2007, titled "SYSTEM, METHOD AND COMPUTER READABLE MEDIUM FOR DETERMINING USERS OF AN INTERNET SERVICE", now issued U.S. Pat. No. 8,856,314, issued on Oct. 7, 2014, which claims the benefit of provisional patent application No. 60/877,500, filed 28 Dec. 2006, titled "ABUSE SENTRY, AUDIT SENTRY, AUTHENTICATION ICON" the entire contents of each are incorporated by reference herein.

FIELD OF THE INVENTION

This disclosure relates to managing subscribers of an internet service provider (ISP) and in particular to determining the number of separate user browsing workstations utilizing a single subscriber's internet service. The disclosure has particular application for preventing theft of service from either the ISP and/or the subscriber but it is not intended that the disclosure be limited thereto.

BACKGROUND OF THE INVENTION

Most broadband Internet Service Providers, ISPs, supply access to their Internet access network through the use of a Cable modem, DSL modem, or Wireless modem. The majority of subscribers to these services typically utilize a router incorporating Network Address Translation (NAT) as a firewall and also as a means to permit multiple personal computers (PC)s in the residence to utilize simultaneous access to the Internet.

Many of the routers are wireless routers permitting residential PCs to access the Internet through either a wired or wireless (Wi-Fi) connection to the router.

The ISP can utilize existing network devices that can observe the activity occurring at the subscriber modem at the Internet Protocol (IP) level. However, according to Internet Protocol and the design of NAT routers, the activity observed at the modem appears to originate at a single IP device, the NAT router, and evidence of the number of real workstations that are active behind the NAT router, and even cascaded NAT routers, is hidden.

ISPs typically have Terms of Service and agreements in the contracts with the subscriber that prohibits the subscriber from extending the Internet access beyond the boundaries of the residential premises. However, inexpensive, off-the-shelf NAT routers can be interconnected and cascaded by simple wired and wireless connections in an arbitrary tree-and-branch topology that provides full, unhindered Internet access to all participants. This simple extensibility, the very high speeds now offered by ISPs, and the easily-hidden installation of the interconnections make it difficult to detect where service re-distribution is occurring. In addition, the widely used Wi-Fi wireless routers are frequently installed with the default configuration that provides free, unhindered access to all within the umbrella of the signal, often extending throughout an entire multi-tenant building or buildings. Problems with this situation include theft-of-service resulting in lost revenue to the ISP as well as dissatisfied subscribers whose performance is being compromised by unknown parasitic users causing support problems.

What is required, is a system, method and computer readable medium that is capable of determining the presence of multiple users on a single subscriber account.

SUMMARY OF THE INVENTION

In one embodiment of the disclosure, there is provided a method of determining a number of users on a subscriber account comprising receiving data; determining a subscriber account associated with said data; determining a user associated with said data; and associating said user with said subscriber account.

In one embodiment of the disclosure, there is provided a network comprising at least one internet service provider that provides an internet connection for one or more subscriber accounts; and at least one data processing system comprising at least one database; and at least one query engine that executes one or more queries on said at least one database; wherein said data processing system receives data received by said at least one internet service provider from said one or more subscriber accounts; wherein said query engine executes a first query on said at least one database to determine a subscriber account identity associated with said data; wherein said data processing system determines a user associated with said data; and wherein said data processing system associates said user with said subscriber identity in said at least one database.

In one embodiment of the disclosure, there is provided an internet service provider comprising at least one router; and a packet processing engine; wherein said at least one router routes one or more data packets received by said packet processing engine from a user; wherein said packet processing engine determines if said one or more data packets are associated with a subscriber account having a number of associated users above a threshold number of users; and wherein said internet service provider redirects a URL page request from said user if said one or more data packets are associated with a subscriber account having a number of associated users above said threshold number of users.

In one embodiment of the disclosure, there is provided a method of operating an internet service provider comprising receiving one or more URL page requests into the internet service provider from a subscriber account; determining a number of users associated with said subscriber account; and redirecting said URL page requests if said number of users is greater than a threshold number of users.

In one embodiment of the disclosure, there is provided a computer readable medium comprising instructions for receiving data from a subscriber account; determining a number of users associated with said subscriber account; performing a comparison of said number of users with a threshold; and taking an action with said data dependent on an outcome of said comparison.

BRIEF DESCRIPTION OF THE DRAWINGS

The invention will now be described, by way of example only, with reference to specific embodiments and to the accompanying drawings in which.

DETAILED DESCRIPTION OF THE INVENTION

In the Applicant's earlier patent application U.S. Ser. No. 10/023,674 and U.S. Ser. No. 10/623,893, the entire contents of which are explicitly incorporated herein by reference, the present Applicants described networks in which communications could be provided from an ISP to a subscriber of the ISP. In the referenced applications, a redirection device was placed in the path of upstream traffic from the subscriber. The redirection device, operating under the control of a consolidating and management device elsewhere in the network, processed upstream data packets to determine when targeted communications to the subscriber were required.

Figure 1:
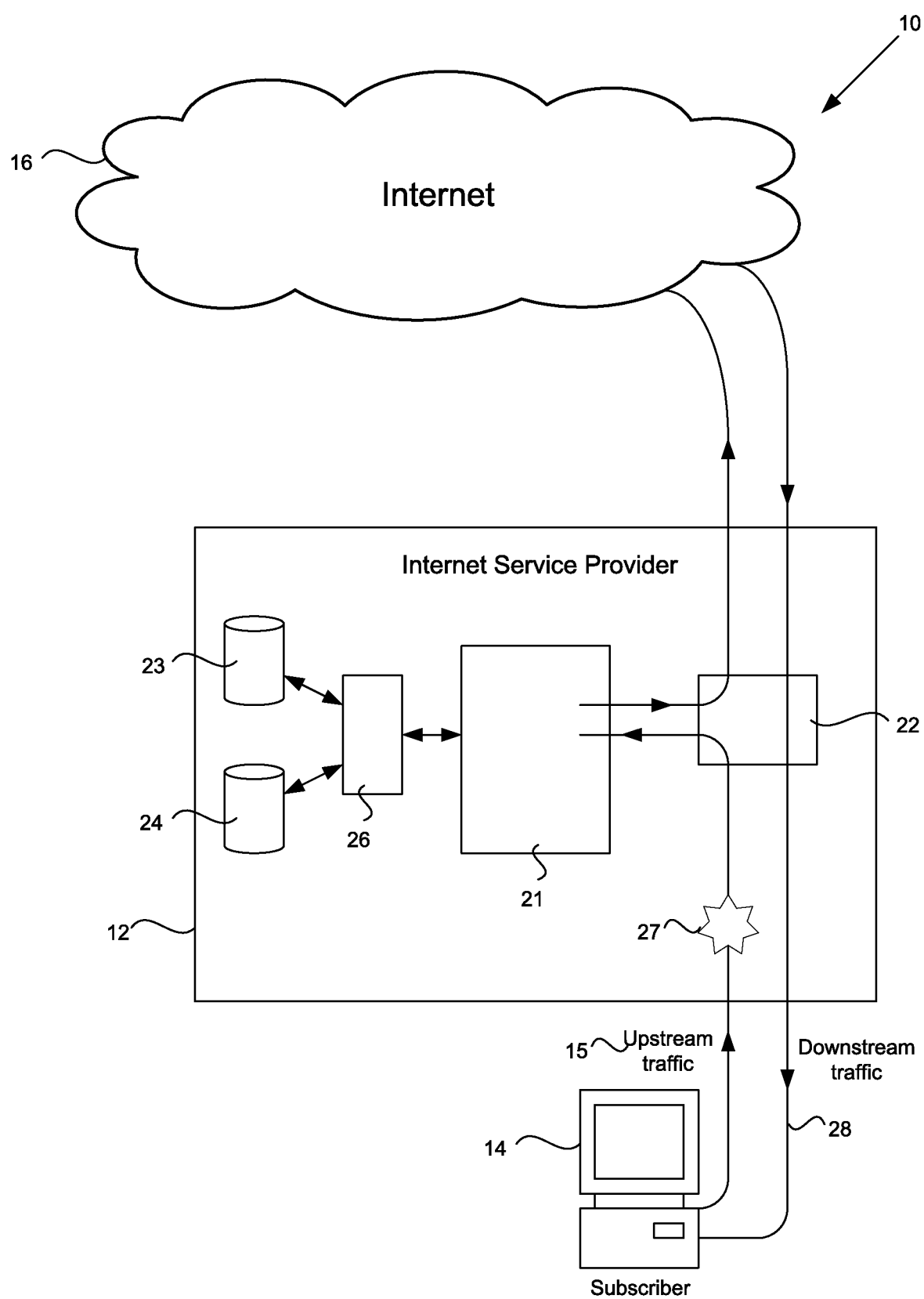
FIG. 1 schematically illustrates a network in accordance with an embodiment of the disclosure.

The present embodiments utilize many of the features and functionalities of the networks described in the Applicant's earlier patent applications referenced above. In FIG. 1, there is shown a system or network 10 in accordance with an embodiment of the disclosure. In the network 10, an ISP 12 provides a link between a subscriber device 14 and the internet 16. For the sake of clarity, in the following embodiments the subscriber device 14 will be referred to specifically as a personal computer, or PC. However, it will be readily understood by the person skilled in the art that the subscriber device 14 may be any internet enabled device such as a personal computer (PC), laptop, palm device, mobile telephone, gaming console and the like, and all such internet enabled devices are to be considered equivalent.

The network 10 includes at least one redirection device 21 that is placed at the path of upstream traffic 15 from the subscriber 14, either in the path or in a position to monitor the path. As described in the above referenced earlier applications, the redirection device 21 may be placed at many points within the network 10 and is preferably placed at an edge of the network that represents the last scaleable point in the operator's network. In one embodiment, the redirection device 21 is placed within the ISP 12. The term redirection device is used herein in order to provide consistency with the Applicant's earlier patent applications referenced above. The person skilled in the art will understand from the foregoing description that in the context of the present disclosure, the redirection device may not perform a redirection function in all embodiments.

The network 10 also includes a consolidating and management device 26, for example of the type as described in the Applicant's earlier applications referenced above. The consolidating and management device 26 is operatively associated with the redirection device 21 to form a data processing system, and more particularly a packet processing system, as will be described in greater detail below.

The ISP 12 includes a router or switch 22, a redirection device 21 as described above and an address provisioning database 23. The address provisioning database 23 stores associations between subscriber accounts of the ISP and IP addresses allocated to the subscribers. A second database 24 stores associations between subscriber accounts of the ISP and users of the subscriber accounts, as will be described below. The consolidating and management device 26 provides a query engine for accessing data from the databases 23, 24 in response to requests from the redirection device 21.

While two databases 23, 24 are illustrated and described herein for clarity, the person skilled in the art will readily understand that the two databases 23, 24 can be consolidated into a single database or that the two databases can be divided into a higher number of databases. For example, the databases 23, 24 may be consolidated with a database for storing an association between a subscriber and an electronic mail sending profile of the subscriber, as described in the Applicant's application Ser. No. 12/004,634, now issued U.S. Pat. No. 8,700,715, the entire contents of which are herein incorporated by reference. Alternatively or in addition, the databases 23, 24 may be consolidated with a database for storing an association between a subscriber and a shared secret as described in the Applicant's application Ser. No. 12/004,645, now issued U.S. Pat. No. 8,161,284, the entire contents of which are herein incorporated by reference.

Figure 7:
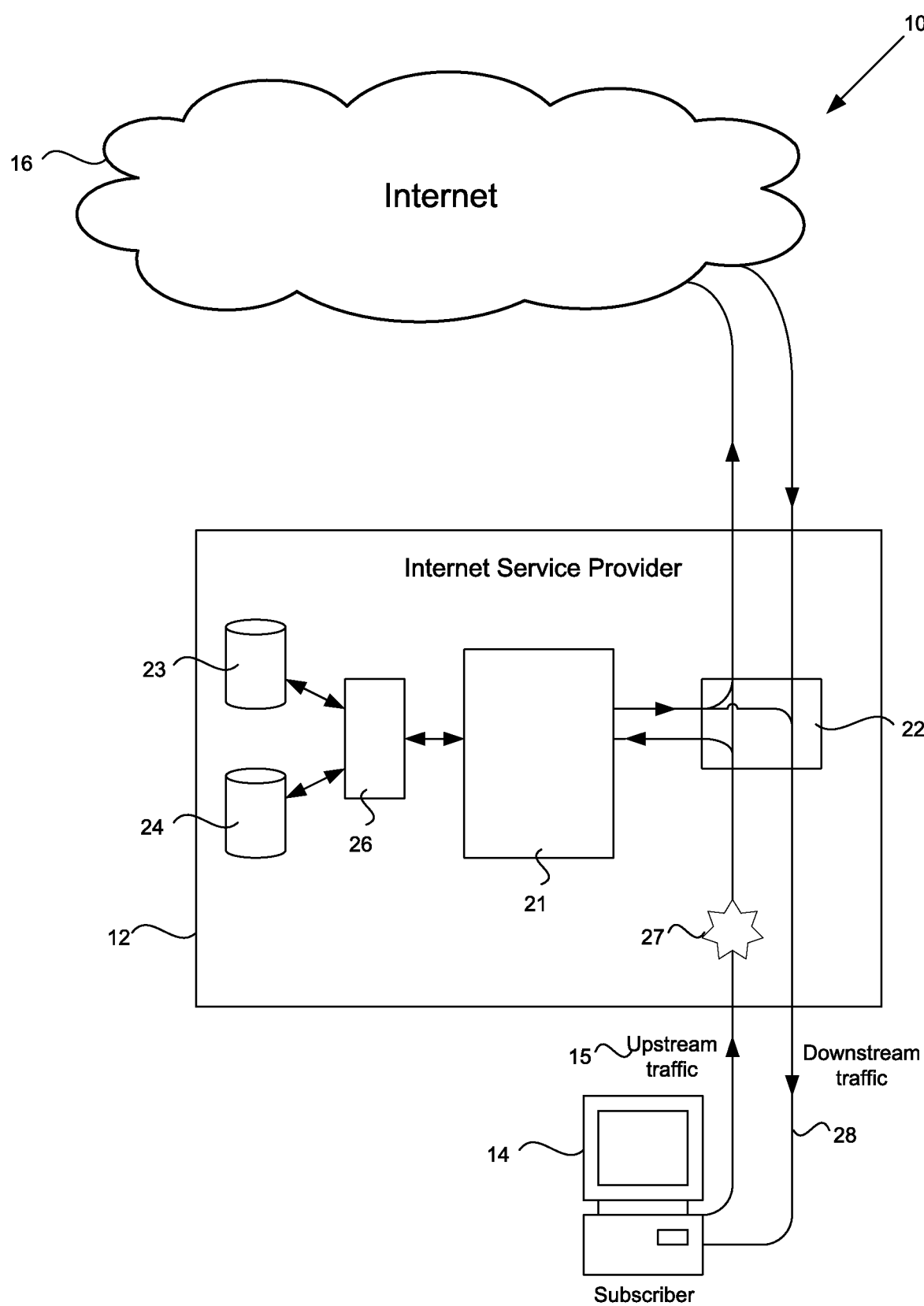
FIG. 7 represents an alternative network configuration.

Downstream traffic from the internet 16, indicated by path 28 is routed by the router 22 to the intended subscriber 14. Upstream traffic in the form of data packets 27 follow the path 15 from the subscriber 14 to be routed by the router 22 to the redirection device 21, thence back to the router 22 and onto the internet 16. In an alternative embodiment shown in FIG. 7, upstream traffic 15 passes directly through the Internet provider with the addition of a "mirror port" or "tap" allowing the redirector, 21, to monitor the upstream traffic.

Figure 2:
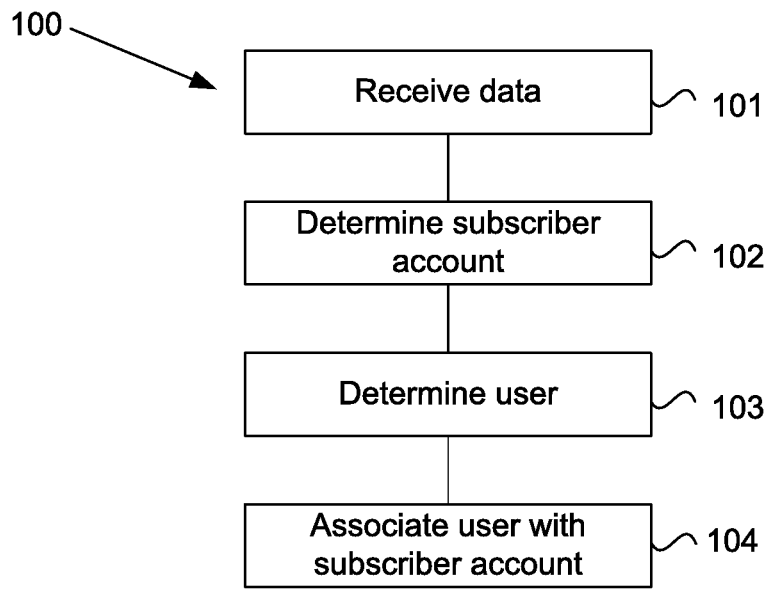
FIG. 2 represents a method for determining a number of users associated with a subscriber account of an ISP.

The operation of the system 10 will now be described with reference to FIG. 1 and to the flowchart 100 illustrated in FIG. 2. At step 101, data is received from the subscriber 14 and a subscriber account associated with the data message is identified at step 102. The system 10 then determines a user associated with the data message (step 103) and associates the user with the subscriber account (step 104).

Figure 3:
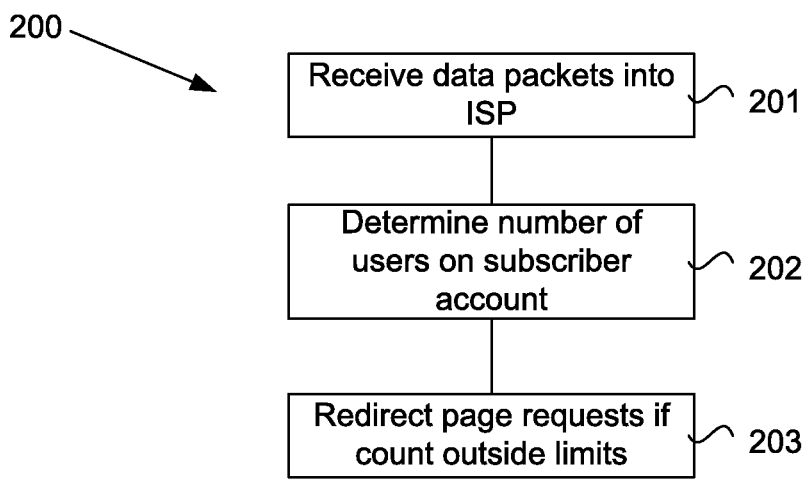
FIG. 3 represents a method for redirecting URL page requests depending on a number of users of an ISP subscriber account.

In one embodiment, the method steps described above are performed within the ISP as illustrated in the flowchart 200 of FIG. 3. At step 201, data packets 27, such as URL page requests, originating at the subscriber are received in the ISP 12 and provided to the router 22. The router 22 passes selected packets to the redirection device 21 for processing. In one embodiment, the router passes packets derived from implanted cookies as will be described below.

The redirection device 21 first analyzes the data packet 27 to retrieve an IP address of the data packet 27. The redirection device 21 forwards the IP address to the consolidation and management device 26, which executes a first query on the address provisioning database 23 to retrieve a subscriber account identity associated with the IP address. The redirection device 21 then retrieves a user identity from the data packet 27 and logs an association between the user identity and the subscriber account in the database 24.

At the time of logging the user association, or at some other time, the consolidation and management device 26 executes a second query on the subscriber/user association database 24 to perform a count of the number of users associated with the subscriber account to determine if additional action is required (step 202). If the count is within allowable limits, then no additional action is required at the time of logging the user association, and the data packet is re-routed back to the router 22 where it continues to be processed by the ISP as usual. However, if the user count is outside allowable limits, then the ISP may take appropriate action, such as redirecting the URL page request (step 203).

The ISP 12 may be configured to take different actions based on the count of users. In one embodiment, a threshold number of users may be set, either by the ISP or by an authorized user of the subscriber account using a web based form when initializing the subscriber account. When a new user attempts to communicate with the ISP, the redirection device may determine that the addition of the new user to the subscriber account will exceed the allowed user threshold and thus the ISP may re-direct the new user to notification pages indicating an excess count of users. Other methods for automatically blocking network communications to the new user may be apparent to the person skilled in the art and are considered equivalent. Blocking access to an illegitimate user will prevent the user from illegally accessing the network, as desired. However, if the new user is a legitimate user, that user will takes steps to remedy the situation with the ISP, which may uncover other, illegitimate, users of the subscriber account.

In one embodiment, the consolidation and management device 26 may periodically execute a count query on the user association database 24. Whenever a count of users associated with a subscriber account exceeds an allowed threshold, a notification may be sent to an authorized user of the subscriber account indicating the count status and suggesting remedies to fix the problem. A message may be sent through any suitable medium such as by an e-mail to an e-mail address registered with the subscriber account.

Figure 4:
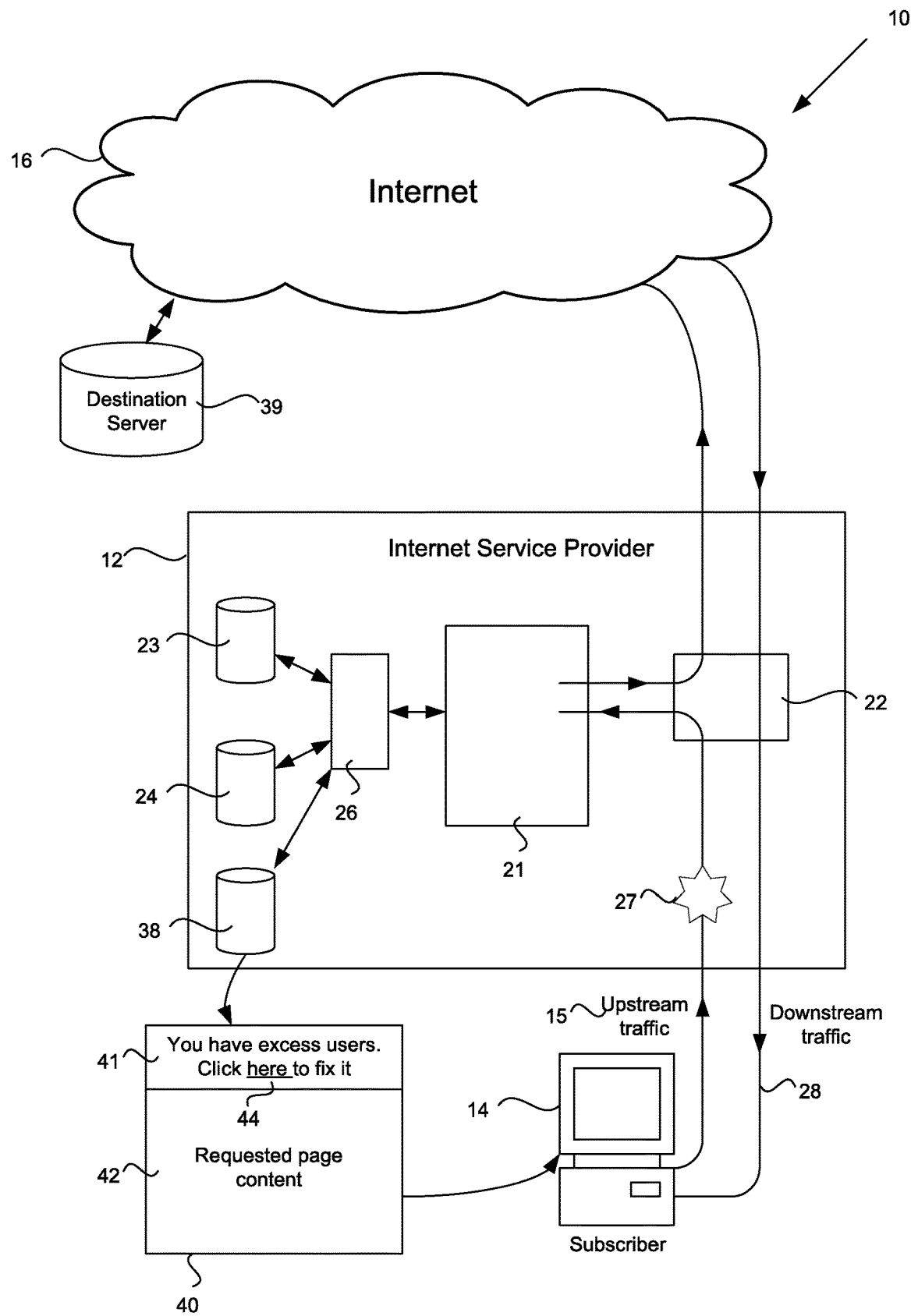
FIG. 4 schematically illustrates providing a notification to a user.

In an alternative embodiment, a web-browser message may be sent to a user of a subscriber account using the techniques described in the Applicant's earlier applications referenced above. For example, with reference to FIG. 4, when a user association count exceeds an allowed threshold, a flag may be set in a policy database 38 that identifies the subscriber account as requiring notification of the count. When the redirection device 21 receives a web page request, the redirection device 21 processes the request to determine the IP address. The redirection device 21 then checks, via the consolidating and management device 26 whether a notification is pending for the current subscriber account associated with the IP address. If a notification is pending, the redirection device 21 provides to the subscriber an HTML redirection to destination server 39 that combines the destination URL in the page request and the URL for the message into a new page redirection for the subscriber's browser to fetch. In one embodiment, in addition to the requested page content 42, the new page 40 includes a banner 41 or similarly visible message that indicates to the user 14 that the subscriber account has an excess number of users. The banner message 41 may indicate a possible cause, such as an unencrypted wireless link, as well as a hyperlink 44 to a downloadable facility for remedying the problem. The downloadable facility and/or the banner message 41 may include a reset facility for resetting the user count on the subscriber account once the problem has been acknowledged and verified by an authorized user of the subscriber account. In one embodiment, the new page 40 may include an authentication code that verifies the authenticity of the count notification to the subscriber. In one embodiment, the authentication code may be a shared secret, for example as described in the Applicant's application Ser. No. 12/004,645, now issued U.S. Pat. No. 8,161,284, referenced above.

In one embodiment, the user identity is retrieved by first placing a hidden browser cookie incorporating a unique, logged, identifying number, possibly generated randomly and possibly other information such as time and date, with the user through the issuance of an associated bulletin message with no visibility to the user. Techniques for placing the cookie are described in the Applicant's earlier patent applications referenced above. Upon later browser activity, the cookie is retrieved to identify each separate browser. Data derived from the retrieved cookie can be used to uniquely identify the user as separate from other users detected at the account. The cookie may be placed and retrieved at varying intervals to optimize the accuracy of the count of users associated with a subscriber account or to observe the flux of continuously different transient users as may occur in an insecure Wi-Fi network accessible from a public area.

In one embodiment, the user identity may be derived from internet browser requests by observing and determining a user "fingerprint" of each browser on an account through the discrimination between host headers propagated by the users' browsers to any accessed internet site. This header includes identification of the users' operating system and version, browser and version, and the suite of plug-ins available within that browser configuration. The user fingerprint may be associated with the subscriber identity and stored in the database 24 or may be hashed in order to allow enumerating of separate users but to assure user privacy in the logs.

In one embodiment, the redirection device processes the data packets to determine a Media Access Control (MAC) address of the network-facing IP device on the account, most frequently a NAT router. The MAC addresses are assigned to manufacturers and most frequently can identify the likely vendor of a wireless router used on the account. Associating MAC addresses of the routers and other devices that interface with the ISP with the subscriber accounts can aid in identifying where theft of service is occurring, as these devices are typically fixed for a particular subscriber account.

The consolidation and management device 26 may periodically execute a query on the database that determines the most recent activity of the users associated with the subscriber account. If an associated user has not had any activity within a predetermined timeframe, for example one month, then the consolidating and management device 26 updates the database 24 by removing the inactive user, thereby reducing the count of users associated with the subscriber account. In one embodiment, the inactive user is only removed from the count, for example by resetting an ACTIVE status flag, rather than deleting the user from the subscriber account, so that any user fingerprint is maintained on the database and can be reestablished if that user again becomes active. The indication of a continual flux of new users with others becoming inactive can indicate an instance of a publically-available Wi-Fi associated with the account even though the absolute count at any point in time may not be very high.

The user association database may indicate one or more users of a subscriber account as authorized users. For example, a default authorized user fingerprint may be derived from a user that first registers the subscriber account with the ISP. The registering user is the most likely authentic user. Other authorized users may be nominated, for example through a web based form. An authorized user may be a user with subscriber account administration rights and is therefore authorized to undertake remedial actions. In one embodiment, the display of the notification may require the provision of a shared secret, for example as described in the Applicant's application Ser. No. 12/004,645, now issued U.S. Pat. No. 8,161,284, referenced above. The requirement for a shared secret ensures that warning notifications are only provided to authorized users of the subscriber account.

Figure 5:
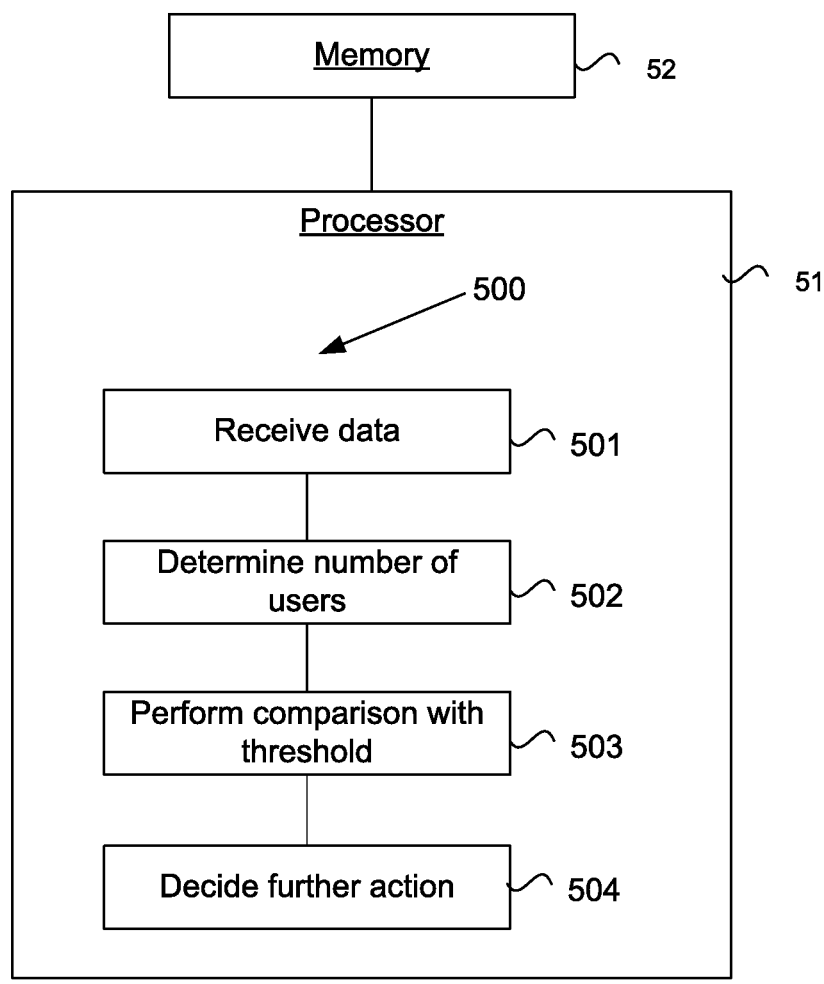
FIG. 5 represents a processor executing an instruction set for determining an excess user condition.

In one embodiment depicted in FIG. 5, the ISP 12 includes at least one processor 51 operatively associated with at least one memory 52. The memory 52 stores an instruction set 500 executable on the processor 51. Executing the instructions causes the processor 51 to receive data from a subscriber account (501). The processor 51 then determines a number of users associated with the subscriber account (502) and compares the number of users with a threshold (503). The processor 51 then determines an action to be taken depending upon an outcome of the comparison (504). In one embodiment, the action taken may be any of the actions described previously.

Figure 6:
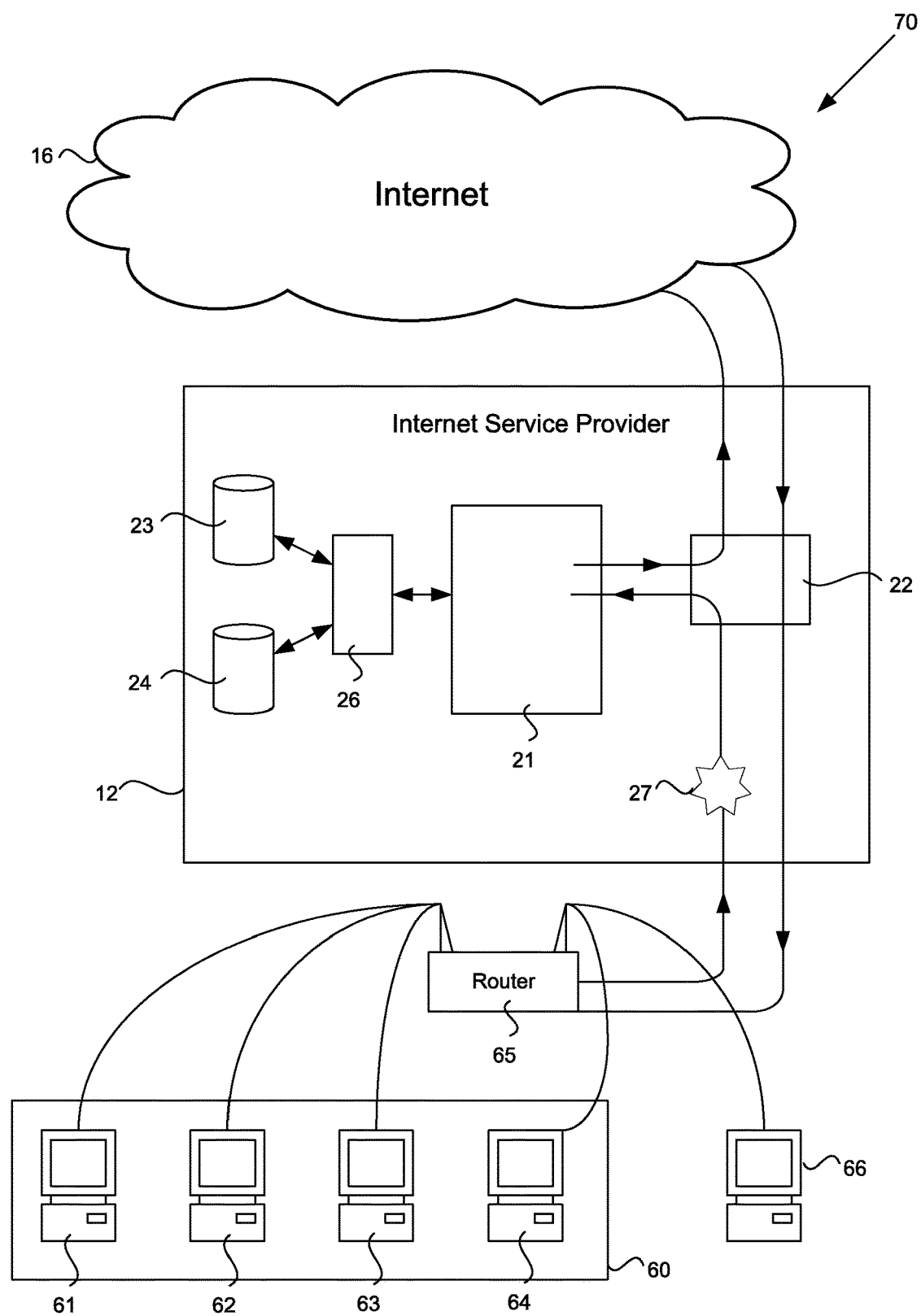
FIG. 6 represents a network providing a plurality of workstations connected to a wireless router.

In FIG. 6, there is illustrated a network 70 in which a premises 60 includes four workstations 61, 62, 63, 64 connected to the ISP 12 via a wireless router 65. Of the four workstations, workstation 61 is considered to relate to an authorized user of the subscriber account. An additional workstation 66 is outside of the premises 60 but within the network coverage provided by the router 65. In an example of the systems described above, an allowed threshold of four users may be associated with the subscriber account. When the fifth user at unauthorized workstation 66 connects to the ISP 12 through the wireless router 65, redirection device 21 associates the fifth user with the subscriber account in the database 24 and determines that the allowed threshold is exceeded. The user's requested web pages may include a notification that the allowed user count has been exceeded or a request to contact the Internet Provider may be preferable to protect the privacy of the account holder. Other users 62, 63, 64 will also received similar notifications and redirections when URL page requests are made. The notifications and redirections will continue, either with every page request or periodically, until action to remedy the high user count is taken and the count is reset. In addition, when workstation 61 connects to the ISP, web page requests are interpreted by the user association database 24 as originating from the authorized user of the subscriber account and thus the web page requests are redirected to incorporate a link to downloadable remedial and count reset facility.

The presently described embodiments demonstrate mechanisms that automate the identification of likely accounts where intended or unintended theft of service is occurring and provides remedial actions through automated communications to the identified subscriber workstations. The communication can continue to encourage the subscriber to "lock down" their wireless network with authentication passwords and encryption by means of simple instructions or even a "click-to-fix" link to a downloadable automated facility that will do it for them. The communications can also dissuade intentional theft of service by providing a display of a message that demonstrates that the ISP is aware of the large number of users on the account.

An advantage of the embodiments herein described include that subscriber account violations can be rapidly detected using network devices that are relatively simple to install within the ISP and do not require all network traffic to pass through them. In particular, the redirection device 21 requires only read-only access to the data packets that it processes both for enumerating the number of users as well as communicating back to the users that there is a problem. A further advantage is that the embodiments may be implemented without updates being required to subscriber hardware or software and thus are instantly applicable across all subscribers to the ISP.

While one redirection device is shown within the ISP, the person skilled in the art will readily understand that any number of redirections devices may be provided for processing upstream data packets. In particular, separate redirection devices may be provided for separate channels within the ISP. Typically, a single consolidating and management device can be used to manage a plurality of redirections devices and to execute the queries to the databases. However, the person skilled in the art will readily understand that a plurality of consolidating and management devices may be employed.

While a single ISP has been described and illustrated, the person skilled in the art will readily understand that a plurality of ISPs may be provided that utilize a common data processing system or that each have an associated data processing system as described above.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:

receiving a URL page request from a user of a user device operating an internet browser;

determining a subscriber account associated with said URL page request;

identifying a user fingerprint associated with the user, the user fingerprint comprising user identity information derived from header information transmitted from the user's internet browser to at least one accessed internet site;

associating the user fingerprint with the user's identity and the subscriber account;

if the subscriber account has a number of associated users above a threshold number of users, then redirecting the URL page request received from the user to a notification page which indicates to the user that the number of users is above the threshold number of users, and wherein at least one user associated with said subscriber account is an authorized user; and determining if said URL page request is received from said authorized user, wherein a URL page to which the user is redirected is dependent on whether said user from which said URL page request is received is the authorized user.

2. The method according to claim 1 wherein determining a subscriber account comprises determining an IP address provided in said URL page request, and retrieving said subscriber account from at least one database using said IP address.

3. The method according to claim 1 wherein associating said user with said subscriber account comprises storing an association between said user and said subscriber account in at least one database.

4. The method according to claim 3 further comprising enumerating a number of users associated with said subscriber account.

5. The method according to claim 4 wherein enumerating a number of users comprises counting a number of users associated with said subscriber account in said at least one database.

6. The method according to claim 1 wherein the header information comprises at least one of an identification of the user's operating system and version, the user's browser and version.

7. The method according to claim 1 wherein the header information comprises a suite of plug-ins available within the user's browser configuration.

8. The method according to claim 1 wherein said notification comprises a hyperlink to a downloadable remedial facility.

9. The method according to claim 1 wherein said URL page comprises a hyperlink to a count reset facility.

10. The method according to claim 9 wherein said count reset facility that resets a number of users associated with said subscriber account.

11. The method according to claim 1 further comprising storing said user fingerprint in at least one database.

12. The method according to claim 1 further comprising determining the user associated with said URL page request.

13. The method according to claim 12 wherein determining the user associated with said URL page request comprises processing cookie data derived from a cookie of a user web browser.

14. The method according to claim 13 wherein said cookie data uniquely identifies said user web browser.

15. The method according to claim 13 further comprising providing said cookie to said user.

16. A system, comprising:
at least one internet service provider server that provides an internet connection for one or more subscriber accounts; and
at least one data processing apparatus comprising:
at least one query engine processor;
wherein said data processing system receives a URL page request from a user of a user device operating an internet browser, which is received by said at least one internet service provider from said one or more subscriber accounts;
wherein said query engine processor determines a subscriber account identity associated with said URL page request;
wherein said data processing system identifies a user fingerprint associated with a user, the user fingerprint comprising user identity information derived from header information transmitted from the user's internet browser to at least one accessed internet site;
associating the user fingerprint with the user's identity and the subscriber account; and wherein said query engine processor determines a number of users associated with the subscriber account identity;
if the subscriber account has a number of associated users above a threshold number of users, then redirecting the URL page request received from the user to a notification page which indicates to the user that the number of users is above the threshold number of users, and wherein at least one user associated with said subscriber account is an authorized user; and
determining if said URL page request is received from said authorized user, wherein a URL page to which the user is redirected is dependent on whether said user from which said URL page request is received is the authorized user.

17. The system of claim 16, wherein the header information comprises at least one of an identification of the user's operating system and version, the user's browser and version, and a suite of plug-ins available within the user's browser configuration.

18. A system, comprising:
at least one router apparatus; and
a packet processing engine;
wherein said at least one router routes one or more data packets received by said internet service provider from a user of a user device operating an internet browser to said packet processing engine;
wherein said packet processing engine determines if said one or more data packets are associated with a subscriber account, and wherein said packet processing engine identifies a user fingerprint associated with the user, the user fingerprint comprising user identity information derived from header information transmitted from the user's internet browser to at least one accessed internet site, and associates the user fingerprint with the user's identity and the subscriber account; and wherein said packet processing engine determines a number of users associated with the subscriber account;
wherein said internet service provider redirects a URL page request from said user to a notification page which indicates to the user that the number of user is above a threshold number of users if said one or more data packets are associated with a subscriber account having a number of associated users above said threshold number of users, and wherein at least one user associated with said subscriber account is an authorized user; and
wherein said internet service provider determines if said URL page request is received from said authorized user, wherein a URL page to which the user is redirected is dependent on whether said user from which said URL page request is received is the authorized user.

19. The system according to claim 18 wherein said router routes data packets derived from a cookie of a user browser to said packet processing engine, said data packets derived from said cookie uniquely identifying a user.

20. The system according to claim 18 further comprising:
a query engine
wherein said packet processing engine:
retrieves an IP address provided in said one or more data packets;
utilizes said query engine to retrieve a subscriber identity associated with said IP address from said at least one database;
utilizes said query engine to retrieve a number of users associated with said subscriber identity from said at least one database;
compares said number of users with said threshold number of users.

21. A method, comprising:
receiving one or more URL page requests into the internet service provider from a user of a user device operating an internet browser associated with a subscriber account;
determining a subscriber account associated with said one or more URL page requests;
identifying a user fingerprint associated with the user, the user fingerprint comprising user identity information derived from header information transmitted from the user's internet browser to at least one accessed internet site;
associating the user fingerprint with the user's identity and the subscriber account;
determining a number of users associated with the subscriber account;
redirecting said URL page requests to a notification page which indicates to the user that the number of users is above a threshold number of users if said number of users is greater than a threshold number of users, and wherein at least one user associated with said subscriber account is an authorized user; and
determining if said URL page request is received from said authorized user, wherein a URL page to which the user is redirected is dependent on whether said user from which said URL page request is received is the authorized user.

22. The method according to claim 21 wherein determining a number of users associated with a subscriber account comprises determining a subscriber account identity from said one or more URL page requests and executing a query on at least one database using said subscriber account identity.

23. A non-transitory computer readable storage medium configured to store instructions that when executed cause a processor to perform:
receiving a URL page request from a user of a user device operating an internet browser associated with a subscriber account;
determining a subscriber account associated with said URL page request;
identifying a user fingerprint associated with the user, the user fingerprint comprising user identity information derived from header information transmitted from the user's internet browser to at least one accessed internet site;
associating the user fingerprint with the user's identity and the subscriber account;
determining a number of users associated with the subscriber account;
if the subscriber account has a number of associated users above the threshold number of users, then redirecting the URL page request received from the user to a notification page which indicates to the user that the number of users is above a threshold number of users, and wherein at least one user associated with said subscriber account is an authorized user; and
determining if said URL page request is received from said authorized user, wherein a URL page to which the user is redirected is dependent on whether said user from which said URL page request is received is the authorized user.

24. The non-transitory computer readable storage medium of claim 23, wherein the header information comprises at least one of an identification of the user's operating system and version, the user's browser and version, and a suite of plug-ins available within the user's browser configuration.

* * * * *